US007487190B2

(12) United States Patent
Black et al.

(10) Patent No.: US 7,487,190 B2
(45) Date of Patent: Feb. 3, 2009

(54) AUTOMATED IDENTIFICATION AND MARKING OF NEW AND CHANGED CONTENT IN A STRUCTURED DOCUMENT

(75) Inventors: Jason E. Black, Redmond, WA (US); Keith A Burnard, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 10/927,676

(22) Filed: Aug. 27, 2004

(65) Prior Publication Data

US 2006/0047682 A1   Mar. 2, 2006

(51) Int. Cl.
*G06F 17/30* (2006.01)
(52) U.S. Cl. ...................................................... 707/203
(58) Field of Classification Search ...................... 707/1, 707/2, 200, 102, 203; 726/22; 719/310
See application file for complete search history.

(56) References Cited

U.S. PATENT DOCUMENTS

| 5,257,185 | A | * | 10/1993 | Farley et al. | 707/100 |
| 6,065,119 | A | * | 5/2000 | Sandford et al. | 726/22 |
| 6,324,587 | B1 | * | 11/2001 | Trenbeath et al. | 719/310 |
| 6,904,430 | B1 | * | 6/2005 | Livshits | 707/6 |
| 2004/0192189 | A1 | * | 9/2004 | Yuhara et al. | 455/3.02 |
| 2004/0215494 | A1 | * | 10/2004 | Wahlbin et al. | 705/4 |

* cited by examiner

*Primary Examiner*—Etienne P LeRoux
(74) *Attorney, Agent, or Firm*—Lee & Hayes, PLLC

(57) ABSTRACT

A method for indicating changes in a structured document includes identifying a new topic or a modified topic in an updated version of a structured document having one or more topics, generating a table of contents having one or more topic entries associated with the one or more topics, marking a topic entry associated with the new topic or the modified topic with a marker indicating that the associated topic is new or modified. A system includes an unmarked table of contents having an entry associated with a unit of updated topic content, and a marking module marking the entry if the unit of updated topic content has changed or the unit of updated topic content comprises a new topic.

15 Claims, 7 Drawing Sheets

AUTOMATED IDENTIFICATION AND MARKING OF NEW AND CHANGED CONTENT IN A STRUCTURED DOCUMENT

BACKGROUND

Computer users rely upon computers for information related to any number of topics. The information is typically furnished in the form of an electronic document that is accessible by a computer. For example, a "help" manual is a document that describes various topics of an application program. Help manuals are commonly distributed on compact disc or online, such that the user can access help manuals via the computer. Help manuals and other electronic documents are typically organized into units of topic content and a table of contents that enables the user to jump to the desired topic content.

Typically electronic documents are updated over time as new information needs to be added or topic contents change. Document updates are quite common with respect to help manuals because the application programs to which they relate are frequently updated with new features or different functionality. When a user receives the updated help manual, the user typically does not want to reread material that is unchanged from the previous version of the help manual. Rather, the user typically wants to read only the new or changed portions of the updated help manual.

Unfortunately, in order for the user to identify new topics and changes to topic contents, the user must visually compare the updated help manual to the previous help manual. This can be extremely time-consuming, particularly when the help manual is large. For example, a help manual for a large application program can include thousands or tens of thousands of topics. In addition, such manual comparison of help manuals can be a tremendous waste of time because often the majority of content in a later version does not change. As a result, the user must wade through large amounts of content in the later version that he/she has already read in the earlier version to find new or changed content.

Therefore, there is a need for a mechanism to indicate to the user relevant changes in structured documents so that the user does not need to manually determine such changes.

SUMMARY

An implementation of a method indicates changes in a structured document by identifying a new topic or a modified topic in the structured document, generating a table of contents having one or more topic entries, and marking a topic entry associated with the new topic or the modified topic with a marker indicating that the associated topic is new or modified. An implementation of a system includes an unmarked table of contents having an entry associated with a unit of updated topic content, and a marking module marking the entry if the unit of updated topic content has changed or the unit of updated topic content comprises a new topic.

DETAILED DESCRIPTION

Described herein are various implementations of systems and methods for identifying and marking new and changed topics in an updated version of a structured document. In accordance with various implementations described herein, a structured document is a document composed of one or more discrete units of topic content and a table of contents (TOC). When a structured document is updated from a previous version, a marked TOC is generated that indicates differences between the previous version and the updated version.

In one implementation, the marked TOC includes a distinctive marker next to an entry if the entry is new or the topic content related to the entry has changed. The marked TOC is generated from a base set of topic identifiers associated with the previous version, an updated set of topic identifiers associated with the updated version, and an unmarked table of contents. Topics identified in the updated topic set that are not in the base topic set are marked as new. Content of topics identified in both the updated topic set and the based topic set is compared. If the topic content from the previous version is different from the topic content of the updated version, the associated topic entry is marked as updated if the difference is determined to be relevant.

Figure 1:
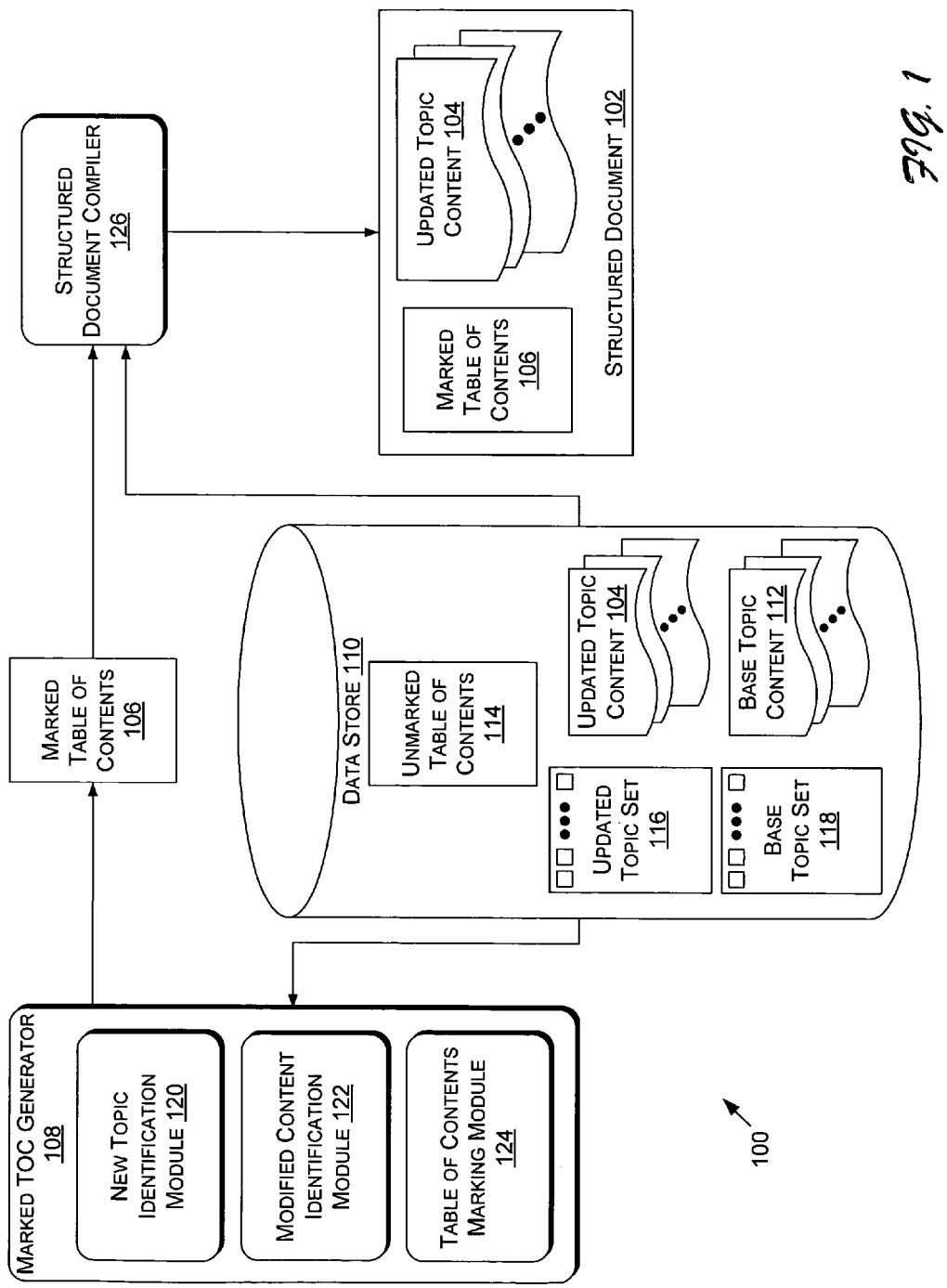
FIG. 1 illustrates an exemplary system for constructing a structured document with a marked table of contents that indicates new topics and changed topic content.

FIG. 1 illustrates an exemplary system 100 that generates an updated version of a structured document 102 with updated topic content 104 and a marked table of contents (TOC) 106. The updated version of the structured document 102 is a version of the structured document that is more recent than one or more previous versions of the structured document. The updated topic content 104 may include new topics or topic content that is modified from a previous version. Entries in the marked TOC 106 indicate whether a topic is new or modified. The updated topic content 104 and the marked TOC 106 are combined to form the structured document 102, which can then be delivered to a user, for example, on a compact disc or over a communication network.

In accordance with implementations described herein, the marked TOC 106 is created by a marked TOC generator 108, which is described in detail below. Briefly, the marked TOC generator 108 employs functions and data for identifying new topics and modified content in the updated topic content 104. Identified modifications can be classified by type and/or analyzed to determine if they are sufficiently important to be indicated in the marked TOC 104. The marked TOC generator 108 then marks a table of contents associated with the updated topic content 104 to indicate the new topics and the modified content.

Various data is used to generate the marked TOC 106 and the structured document 102. This data can be stored in a memory, such as data store 110. The data store 110 includes base topic content 112 and the updated topic content 104. Base topic content 112 is composed of one or more discrete units of topic content from a previous version of the structured document. Updated topic content 104 is composed of one or more discrete units of topic content that will ultimately be included in the updated version of the structured document 102. As used herein, the terms "unit of topic content" and "topic" are used interchangeably.

The updated topic content 104 is typically generated and/or edited by one or more author(s) for inclusion in the updated version of the structured document 102. The term "content" generally refers to any computer-readable and/or human-readable information, such as, but not limited to, textual information, graphical information, or formatting information. In one implementation, the content to be included in the updated topic content 104 is initially written with a word processor, such as MICROSOFT WORD, and then converted to hypertext markup language (HTML).

The process of creating updated versions is repetitive. When the updated version of the structured document 102 is delivered to the user, the editing process begins again to create the next updated version, and the updated version of the structured document 102 becomes a previous version. Therefore, when the updated version is delivered to the user, the base topic content 112 is replaced with the updated topic content 104.

Accordingly, in a particular implementation, each unit of base topic content 112 and the updated topic content 104 is an HTML file. The data store 110 stores the units of base topic content 112 and updated topic content 104 in a directory structure. Each unit of base topic content 112 has a unique name. Similarly, each unit of updated topic content 104 has a unique name. Exemplary directory structures and HTML file names from a help manual are shown below for base topic content 112 and updated topic content 104, respectively:

C:\MyProject\BaseFiles\pptsdHowToSaveFile.htm
C:\MyProject\CurrentFiles\pptsdHowToSaveFile.htm In the above example, the directory path "BaseFiles" contains units of base topic content 112 and the directory path "CurrentFiles" contains units of updated topic content 104. As shown, a unit of base topic content 112 may have the same name as a unit of the updated topic content 104, particularly when the two units serve the same purpose.

After the updated topic content 104 is authored and/or finally edited, a conventional TOC tool (not shown) uses the updated topic content 104 to create an associated unmarked TOC 114. The unmarked TOC 114 includes a list of entries, each of which is associated with a unit of updated topic content 104. Each entry is a human-readable title, name, or brief description of the associated unit of updated topic content 104. Later in the process, as discussed further below, one or more entries in the unmarked TOC 114 may be marked to show that they correspond to new topics or modified topic content.

To facilitate the process of identifying new and modified topics, each unmarked TOC 114 entry is also associated with a topic identifier. A topic identifier is a designation that uniquely identifies a unit of topic content. By way of example, and not limitation, a topic identifier can be a name, number(s), or other symbol. When the unmarked TOC 114 is generated, the topic identifiers are stored in an updated topic set 116 such that each entry in the unmarked TOC 114 can be located using the associated topic identifier. One implementation of the unmarked TOC 114 includes an associated identifier from the updated topic set 116 with its associated entry. Thus, as is discussed further below, an updated topic identifier can be used to locate each unmarked TOC 114 entry as well as retrieve the corresponding unit of updated topic content 104.

After the updated version of the structured document 102 is delivered to the user, the updated topic set 116 becomes a base topic set 118. The base topic set 118 is composed of topic identifiers that correspond to the base topic content 112. As a result, each unit of base topic content 112 can be located and retrieved using the associated topic identifier in the base topic set 118.

After the updated topic set 116 is generated, but before it replaces the base topic set 118, topic identifiers in the updated topic set 116 may or may not match identifiers in the base topic set 118. An identifier in the updated topic set 116 may match at most one topic identifier in the base topic set 118. An identifier in the updated topic set 116 will typically match an identifier in the base topic set 118 when the identifiers correspond to a unit of topic content that serves the same purpose in the updated topic content 104 and the base topic content 112. For example, if the topic "Introduction" exists in both the updated topic content 104 and the base topic content 112, the topic identifier for "Introduction" in the updated topic set 116 should match the topic identifier for "Introduction" in the base topic set 118.

The marked TOC generator 108 uses the unmarked TOC 114, the base topic content 112, the updated topic content 104, the base topic set 118, and the updated topic set 116, to generate the marked TOC 106. In accordance with implementations described herein, the marked TOC generator 108 includes a new topic identification module 120, a modified content identification module 122, and a TOC marking module 124 for performing functions related to generating the marked TOC 106. Each of these modules is discussed in further detail below.

After the marked TOC 106 is generated, a structured document compiler 126 combines the marked TOC 106 and the updated topic content 104 to form the structured document 102. Generally, the structured document compiler 126 links each entry in the marked TOC 106 with the associated unit of updated topic content 104. The structured document compiler 126 will also typically include an index (not shown) in the structured document 102. Any conventional structured document compiler can be used.

Figure 5:
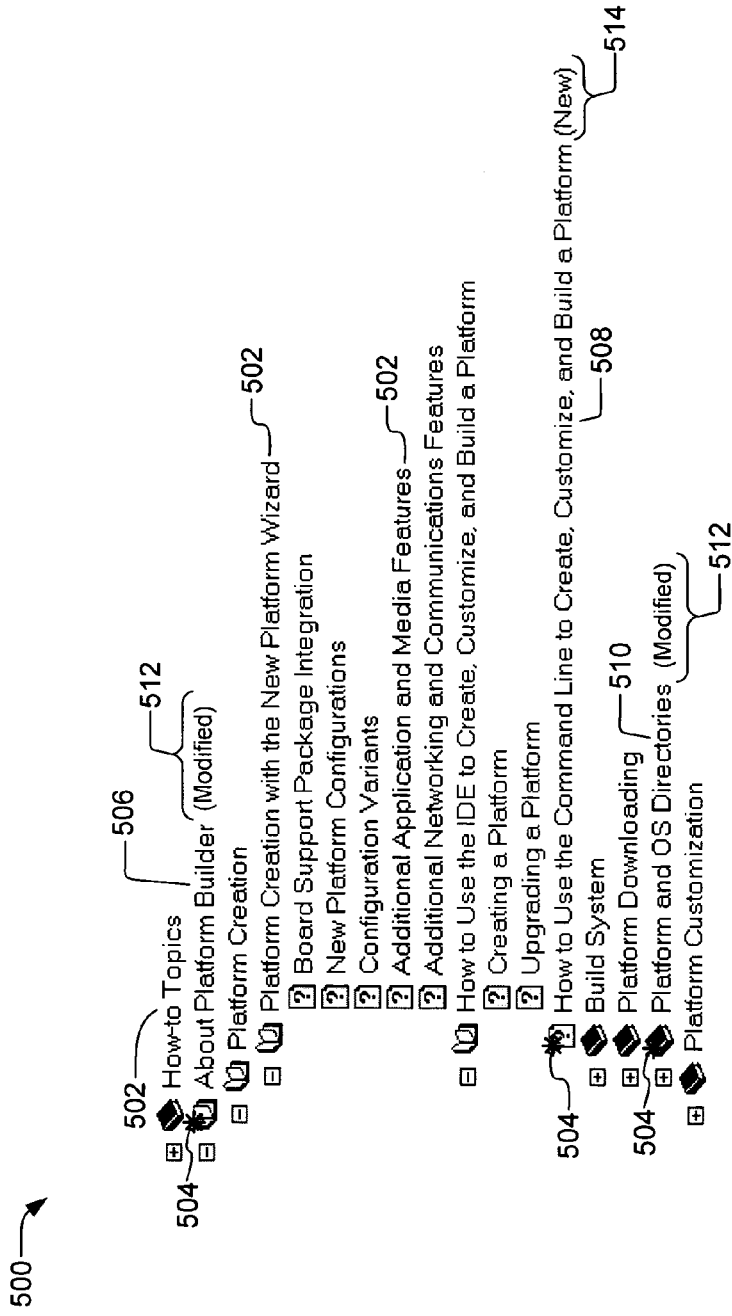
FIG. 5 illustrates a portion of an exemplary marked table of contents.

By way of example, when the structured document is a help manual, the WINDOWS HELP COMPILER from MICROSOFT CORPORATION may be used. A help compiler is a module for conjoining a table of contents and one or more help topics into a structured help document that can be viewed by a user by means of an application program, such as a help viewer. A portion of an exemplary marked TOC for a help manual is shown in FIG. 5 and described below.

The term module is used in a general sense to describe a component that is operable to perform one or more designated functions. A module may be implemented in various ways and forms. For example, a module may be implemented in or as hardware, software, firmware, or in various combinations of hardware, software, and/or firmware, depending on such factors as speed, cost, size, etc. For example, and without limitation, in one implementation each of the modules in the marked TOC generator 108 comprises software that is stored on a computer-readable medium and executed on a computing system, such as the computing system described below with respect to FIG. 7. Each module of the TOC generator 108 will now be generally described with respect to its designated function or functions within the system 100 by way of FIGS. 2-4.

Figure 2:
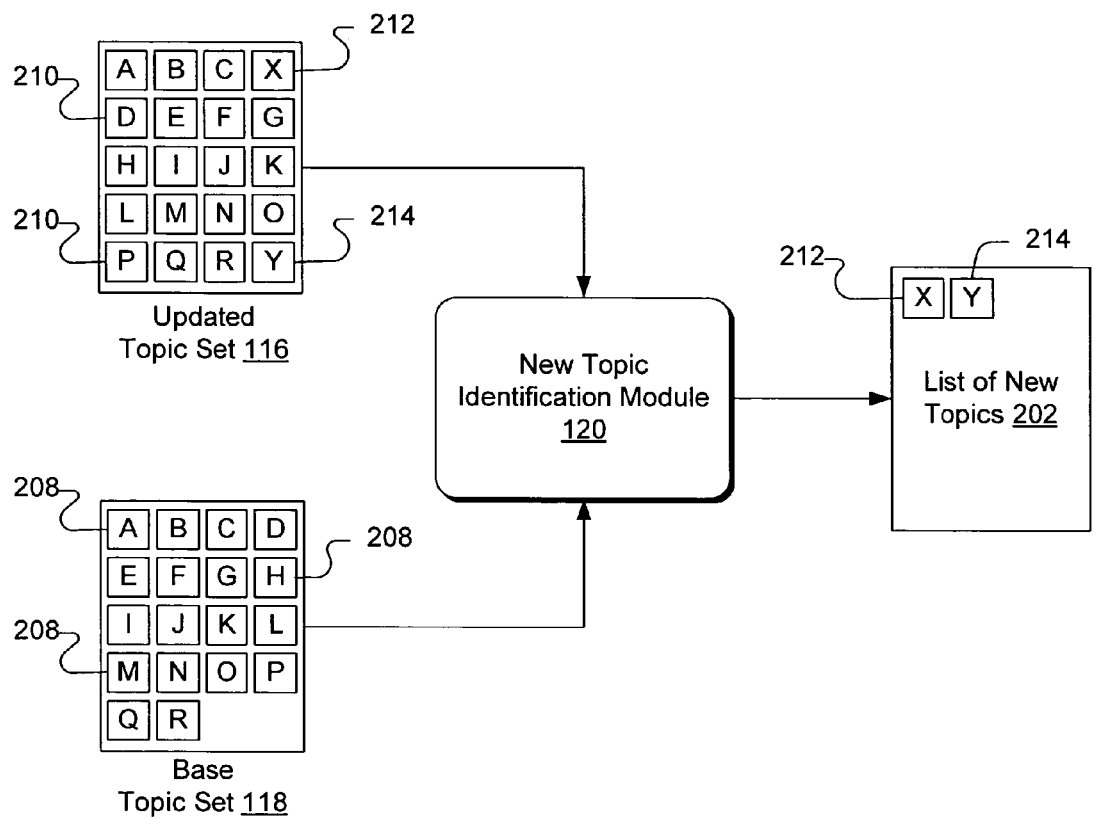
FIG. 2 illustrates a new topic identification module generating a list of new topics related to an updated version of a structured document.

FIG. 2 illustrates a new topic identification module 120 generating a list of new topics 202 related to an updated version of a structured document. The new topic identification module 120 analyzes topic identifiers in the base topic set 118 and an updated topic set 116 to generate the list of new topics 202. The base topic set 118 includes one or more base topic identifiers 208. The updated topic set 116 includes one or more updated topic identifiers 210 that may or may not match identifiers in the base topic set 118. For ease of illustration, each of the identifiers is labeled with an alphabetic character (e.g., A, B, C, etc.).

In accordance with one implementation of the new topic identification module 120, each updated topic identifier 210 is iteratively selected and compared to all of the base topic identifiers 208. If one of the base topic identifiers 208 matches (i.e., is the same as) the selected updated topic identifier 210, then the selected updated topic identifier 210 is a matching topic identifier and is not copied to the list of new topics 202. No further analysis is performed with the selected updated topic identifier 210 and another updated topic identifier 210 is selected for analysis.

On the other hand, if a selected updated topic identifier 210 does not match any of the base topic identifiers 208, then the selected updated topic identifier 210 is determined to be a new topic identifier. The new topic identifier is copied to the list of new topics 202.

As an example, the updated topic set 116 includes two new topic identifiers, a first identifier 212 (labeled 'X') and a second identifier 214 (labeled 'Y'), which are not included in the base topic set 118. During its analysis, the new topic identification module 120 does not find the first topic identifier 212 or the second topic identifier 214 in the based topic set 204. Therefore, the first topic identifier 212 and the second topic identifier 214 are copied to the list of new topics 202.

Figure 3:
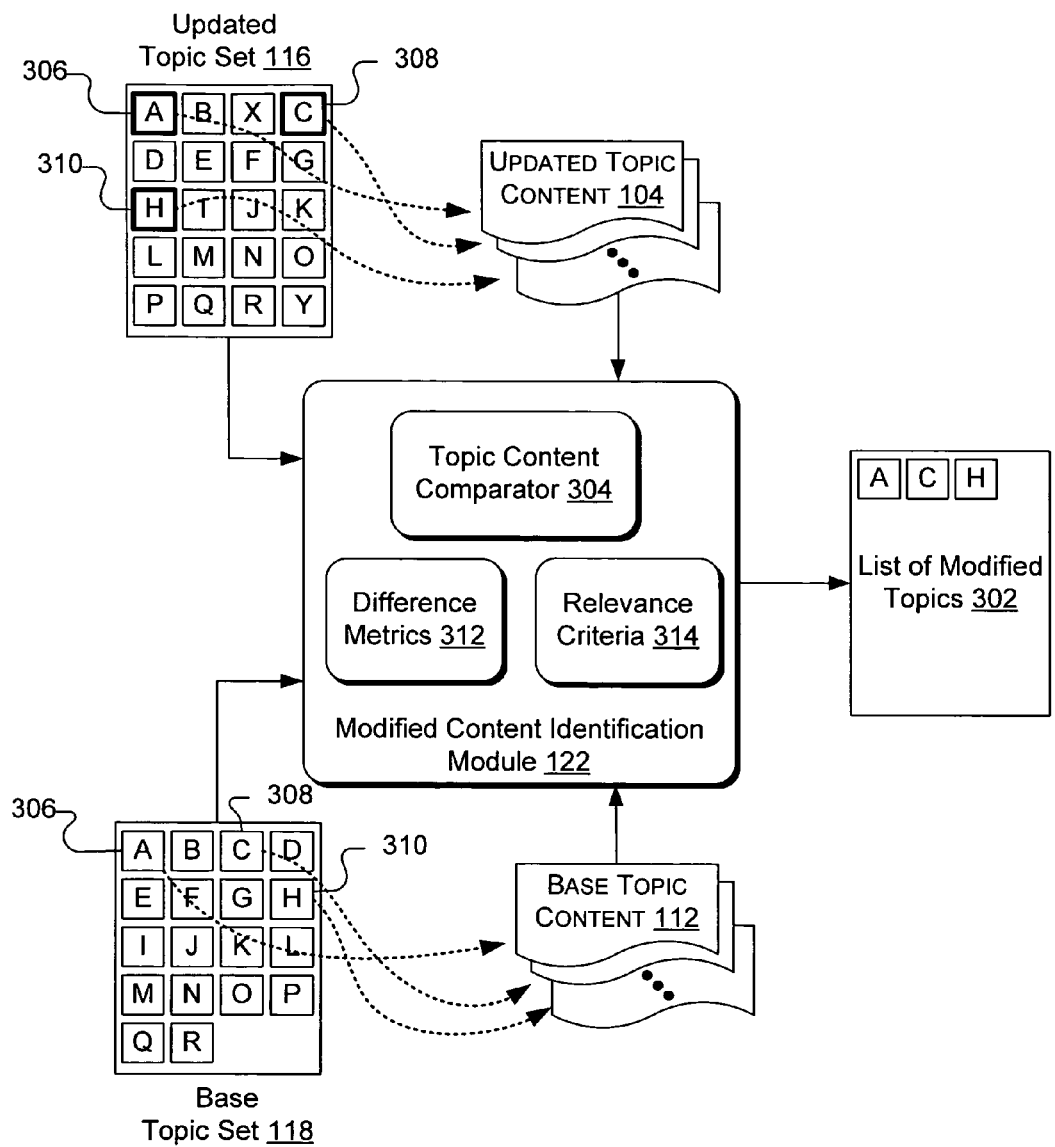
FIG. 3 illustrates a modified content identification module generating a list of topics that have been modified in an updated version of a structured document.

FIG. 3 illustrates a modified content identification module 122 that generates a list of modified topics 302. In this implementation, a modified topic is a unit of the updated topic content 104 that differs a specified degree from the related base topic content 112. As is discussed below, when the modified content identification module 122 identifies a modified topic, the associated topic identifier is copied to the list of modified topics 302.

The modified content identification module 122 iteratively selects each topic identifier from the updated topic set 116 and compares the selected topic identifier with all of the identifiers in the base topic set 118. When a topic identifier is found in the base topic set 118 that matches a topic identifier in the updated topic set 116, a topic content comparator 304 uses the matching topic identifier to retrieve the associated units of content from the updated topic content 104 and the base topic content 112.

To illustrate, it is assumed that topic identifier 306 (labeled "A"), topic identifier 308 (labeled "C"), and topic identifier 310 (labeled "H") each identify a unit of topic content that is modified. Thicker lines are drawn around label "A", label "C", and label "H" in the updated topic set 116 to show that the associated units of updated topic content 116 have been modified. Because topic identifiers 306, 308, and 310 each uniquely identify a unit of topic content, the topic content comparator 304 can use the topic identifiers to locate and retrieve the associated units of updated topic content 104 and base topic content 112. This is shown with dotted arrows extending from each of the topic identifiers 306, 308, and 310 to one of the units of updated topic content 104 or base topic content 112.

The topic content comparator 304 then compares the retrieved unit of updated topic content 104 to the retrieved unit of base topic content 112. Typically, comparing the two units of topic content involves parsing them and identifying differences in the content, including, but not limited to, differences in text and formatting. Based on the differences between the two units of content, the topic content comparator 304 determines a degree of difference between related units of topic content. In a particular implementation, the degree of difference is represented by one or more difference metrics 312 that are generated by the topic content comparator 304.

In one implementation of the topic content comparator 304, the differences are counted to derive the difference metric 312. The difference metric 312 can be given as an absolute number of differences or as a percentage change in a unit of content. In this implementation, differences may be counted in various ways to achieve desired results in marking the table of contents. By way of example, but not limitation, each modification to a word, tag, or formatting symbol may constitute a difference to be counted. Modifications include any change to any part of the content, such as, but not limited to, changes in font, color, size, or inserted or deleted content.

In another implementation, the modifications are first classified in terms of modification types and only certain types of modifications are counted. For example, modifications can be classified as "substantive" or "formal". A substantive modification is a change in the meaning of topic content. Exemplary substantive modifications include, but are not limited to, a change to text in a help manual that is necessitated by a change in functionality of an application program described by the text. Formal modifications are changes in form only, such as, but not limited to, a change in font, color, formatting, or rephrasing that does not change the meaning of the content. In this implementation, the topic content comparator 304 counts or recognizes only substantive modifications for the difference metrics 312.

The topic content comparator 304 then analyzes the difference metrics 312 based on relevance criteria 314. The relevance criteria 314 specify a minimal degree of required difference in order for a unit of updated topic content 104 to be identified in the list of modified topics 302. Thus, a unit of updated topic content 104 will be marked as modified in the TOC only if the degree of difference from the related unit of base topic content 112 meets at least the minimal degree specified by the relevance criteria 314.

In a particular implementation, the relevance criteria 314 include a threshold number of changes that must be present in order for the topic identifier to be included in the list of modified topics. The threshold number may be given as an absolute number or as a percentage change in a unit of content. The topic content comparator 304 compares the difference metric 312 to the threshold, and if the difference metric 312 is greater than or equal to the threshold, the topic identifier is copied into the list of modified topics 302.

In a particular implementation, the processes illustrated in FIG. 2 and FIG. 3 are carried out in stages. In a staged approach, the new topic identification module 120 identifies the new topics in a first stage before the modified content identification module 122 identifies the modified topic content in a second stage. Alternatively, in the first stage, whenever the new topic identification module 120 identifies a matching topic identifier, the matching identifier can be passed to the modified content identification module 122, thereby eliminating the need for the modified content identification module 122 to reiterate through the updated topic identifiers to find the matching identifiers.

Figure 4:
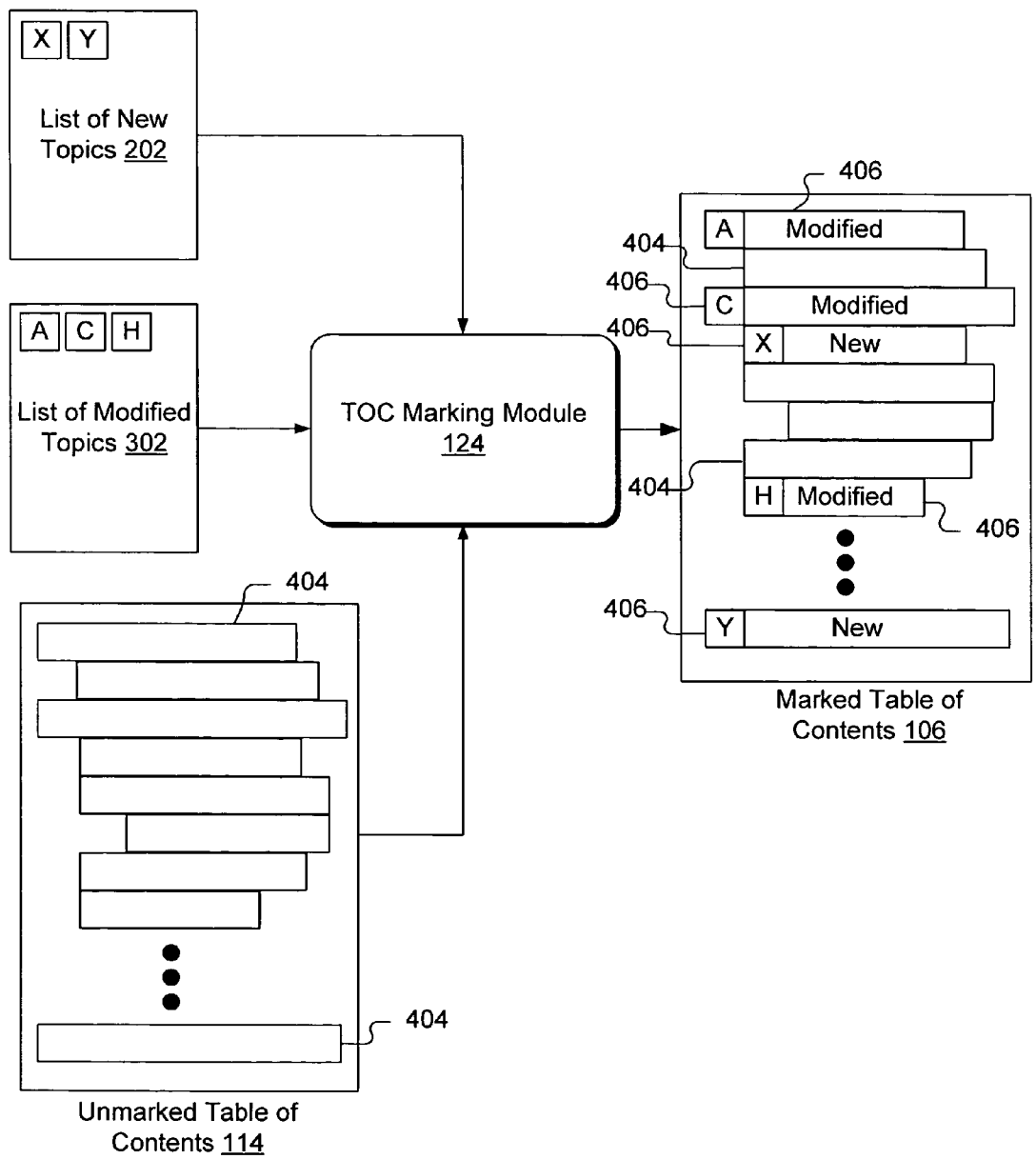
FIG. 4 illustrates a table of contents marking module generating a marked table of contents based on the list of new topics, the list of modified topics, and an unmarked table of contents.

FIG. 4 illustrates an implementation of the TOC marking module 124 generating the marked table of contents 106. As shown, the TOC marking module 124 derives the marked table of contents 106 from the unmarked table of contents 114 based on the list of new topics 202 and the list of modified topics 302.

As discussed above, the unmarked TOC 114 includes one or more unmarked entries 404, each of which is associated with one identifier in the updated topic set. The topic identifiers in the list of new topics 202 and the topic identifiers in the list of modified topics 302 are necessarily in the updated topic set. Therefore, the unmarked TOC 114 includes an entry for each topic identifier in the list of new topics 202 and the list of modified topics 302.

The TOC marking module 124 first locates the entries in the unmarked TOC 114 that are associated with the new topic identifiers and the modified topic identifiers. The TOC marking module 124 then marks the located entries in the unmarked TOC 114 with a distinctive marker and/or text, thereby generating one or more marked entries 406. In one implementation, the TOC marking module 400 places text next to an entry that is descriptive of the type of change. It should be noted that the resulting marked TOC 106 can include both marked entries 406 and unmarked entries 404. To further illustrate, an exemplary marked TOC is shown in FIG. 5.

FIG. 5 illustrates a portion of an exemplary marked TOC 500 that includes exemplary markers indicating new topics and topics with changed content. The exemplary TOC 500 is a TOC for a help manual. Other TOCs with markers such as those shown in FIG. 5 can be readily developed for other types of structured documents. A user typically views and interacts with the marked TOC 500 on a computer through a compiled help module viewer, such as WINDOWS HELP VIEWER from MICROSOFT. The user may also view the content of the help manual through a browser application program, such as INTERNET EXPLORER from MICROSOFT. Through the browser, the user can select from one or more entries 502 in the marked TOC 500 to access the unit of topic content described by the selected entry.

Each entry 502 is implemented as a hyperlink that refers to an associated unit of topic content. As can be seen, the entries 502 are hierarchically arranged into topics, subtopics, and so on. Adjacent to the text of each entry 502 is a conventional symbol, such as a closed book, an open book, a help document, or minus or plus sign, which assist the user in navigating the hierarchy and selecting topics. Thus, for example, a closed book indicates that the user can select the book to expose subtopics within the higher level topic. By selecting a help document, the user's browser is directed to the selected topic.

Marks are placed near TOC entries 502 to indicate that a topic is new or the content therein has changed with respect to a previous version of the structured document. Marks can be in the form of visually distinctive icons. For example, asterisks 504 are pre-pended to three entries: a first entry 506 titled "About Platform Builder", a second entry 508 titled "How to Use the Command Line to Create, Customize, and Build a Platform", and a third entry 510 titled "Platform and OS Directories". Each asterisk 504 indicates that the topic is either new or includes modified content.

Marks in the marked TOC 500 can also take the form of text, or other symbols that describe the type of change. For example, the text "(Modified)" 512 is appended to the first entry 506 to indicate that the associated topic includes modified content. As another example, the text "(New)" 514 is appended to the second entry 508 to indicate that the associated topic is a new topic. As yet another example, the text "(Modified)" 512 is appended to the third entry 510 to indicate that the associated topic has modified content.

Exemplary Operations

Figure 6:
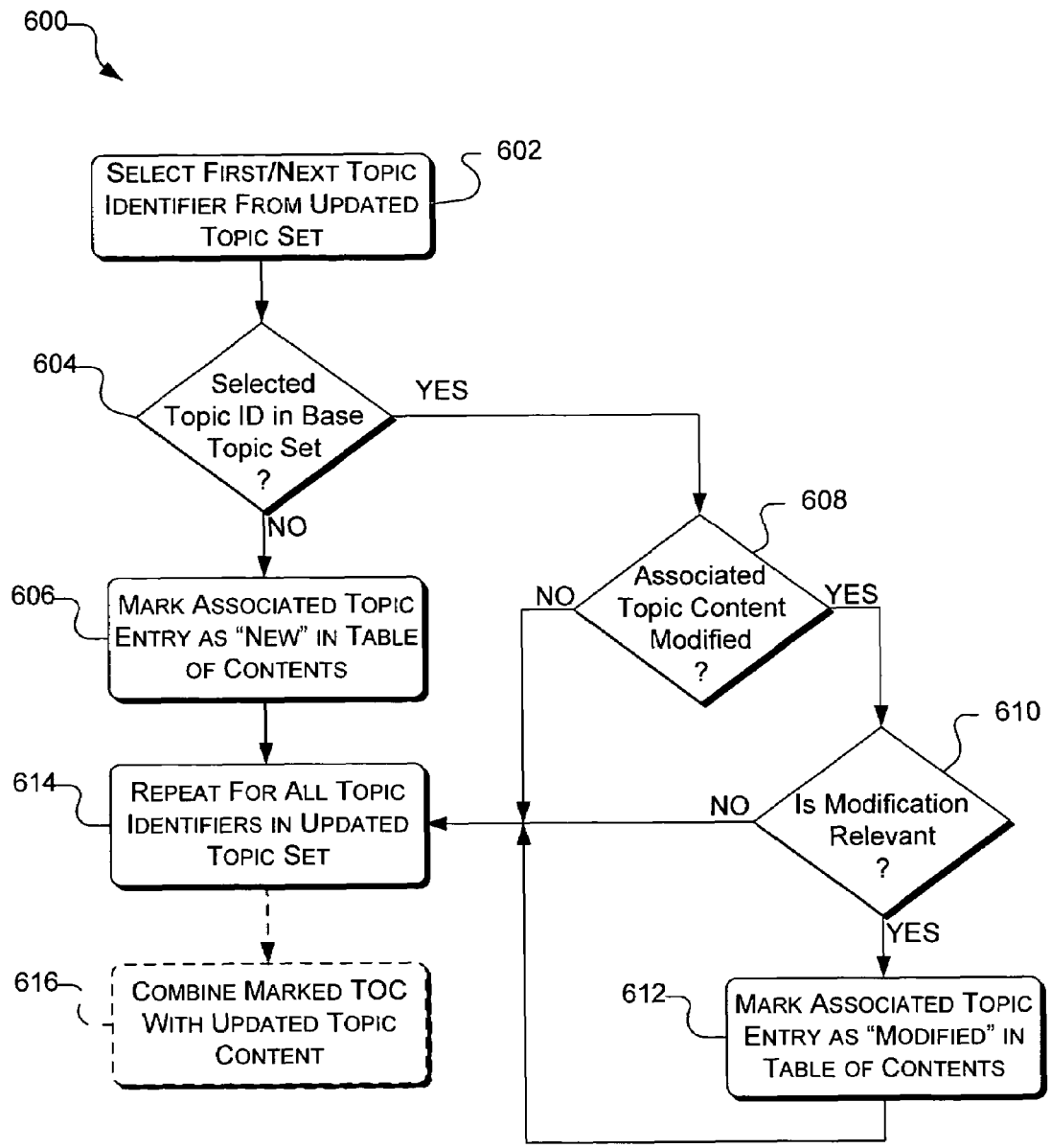
FIG. 6 is a flowchart with exemplary operations for identifying new topics and changes to topic content in an updated version of a structured document and generating a marked table of contents.

FIG. 6 illustrates a new topic and modified topic identification and marking algorithm 600 that can be carried out by the marked TOC generator 108 shown in FIG. 1. The algorithm 600 can also be carried out by systems other than the marked TOC generator 108 shown in FIG. 1. In one implementation, the new topic and modified topic identification and marking algorithm 600 is performed as a batch job. It is assumed that certain data is input to the algorithm 600, including a base topic set, an updated topic set, base topic content, updated topic content, and an unmarked table of contents, such as are described above with respect to FIGS. 1-4.

A selecting operation 602 selects a topic identifier from the updated topic set. A determining operation 604 determines whether any topic identifiers in the base topic set match the selected topic identifier from the updated topic set. The determining operation 604 compares each topic identifier in the base topic set with the selected topic identifier from the updated topic set.

If none of the topic identifiers in the base topic set match the selected topic identifier from the updated topic set, the algorithm 600 branches "NO" to a marking operation 606. The marking operation 606 locates a topic entry associated with the selected topic identifier in the unmarked TOC and marks the topic entry with a distinctive symbol, such as an icon or text, which indicates that the topic entry pertains to a new topic.

If, in the determining operation 604, a topic identifier in the base topic set is found to match the selected topic identifier from the updated topic set, the algorithm 600 branches "YES" to another determining operation 608. The determining operation 608 determines whether topic content associated with the selected topic identifier has been modified in the updated topic content. The determining operation 608 compares the associated updated topic content with the associated base topic content to determine if modifications exist.

If the determining operation 608 determines that the associated topic content includes one or more modifications, the algorithm branches "YES" to another determining operation 610. The determining operation 610 determines whether the one or more modifications are relevant. The determining operation 610 first determines whether each of the one or more modifications is substantive. The determining operation 610 then generates a difference metric.

In accordance with one implementation of the determining operation 610, the difference metric is a count of the number of substantive changes. In this implementation, the determining operation 610 compares the count of substantive changes to a predetermined threshold number. If the count is greater than or equal to the predetermined threshold number, the one or more modifications are determined to be relevant.

If the one or more modifications are relevant, the algorithm 600 branches "YES" to a marking operation 612. The marking operation 612 locates the topic entry in the unmarked TOC that is associated with the selected topic identifier. The marking operation 612 marks the associated topic entry with a distinctive symbol, such as an icon or text, which indicates that the associated topic content is modified.

If the determining operation 608 determines that the associated topic content has not been modified or the determining operation 610 determines that the one or more modifications are not relevant, the algorithm 600 branches "NO" to a repeating operation 614. Similarly, after the marking operation 606 and the marking operation 612, the algorithm 600 branches to the repeating operation 614. The repeating operation 614 repeats the algorithm 600 if any topic identifiers in the updated topic set have not been analyzed. If any topic identifiers have not been analyzed, the repeating operation 614 returns to the selecting operation 602, which selects the next topic identifier from the updated topic set.

The algorithm 600 then iterates again with the newly selected updated topic identifier. When all the updated topic identifiers have been iterated through, the entries in the unmarked TOC that correspond to new or modified topics will be marked accordingly. Thus, the unmarked TOC becomes a marked TOC.

An optional combining operation 616 combines the marked TOC with the updated topic content to form an updated version of a structured document. The combining operation 616 can be carried out with a structured documents compiler, such as a help compiler. When a user receives the updated version of the structured document, the user can use the markings in the marked TOC to quickly locate the new or modified topic content that he or she should read.

Exemplary Computing Device

Figure 7:
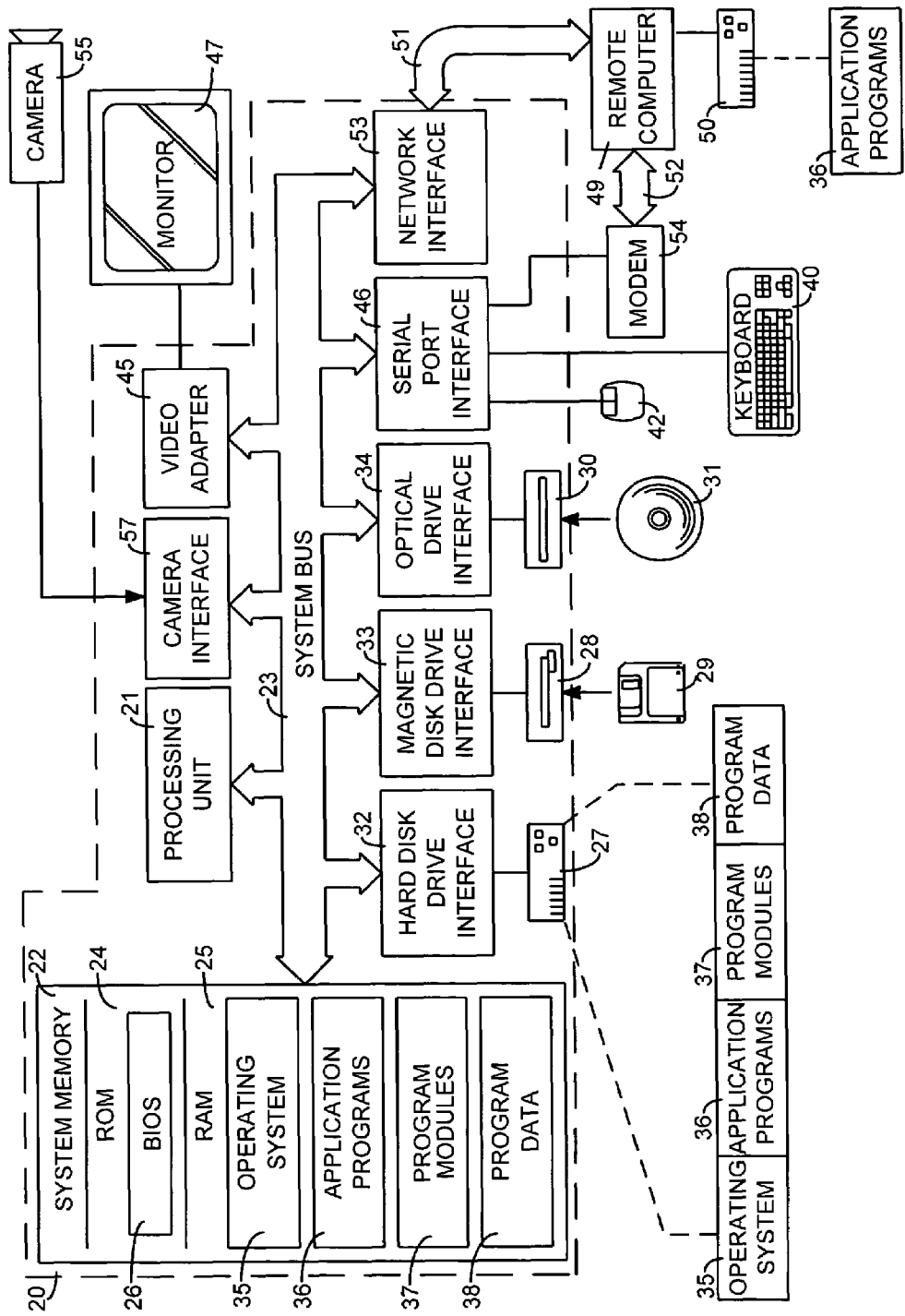
FIG. 7 illustrates a general purpose computer that can be used to implement new and modified content marking systems and methods described herein.

With reference to FIG. 7, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

A camera 55 (such as a digital/electronic still or video camera, or film/photographic scanner) capable of capturing image data can also be included as an input device to the personal computer 20. The images data is input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 7 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. An automatic method of indicating changes in a structured document implemented via a computer, the method comprising:
    determining that a unit of content in an updated version of a structured document and a related unit of content in a previous version of the structured documents are associated with the same entry, wherein determining comprises:
        accessing a base topic set having a single topic identifier associated with each unit of content in the previous version of the structured document;
        accessing an undated topic set having a single topic identifier associated with each unit of content in the updated version of the structured document;
        identifying a particular topic identifier in the updated topic set that corresponds to the same particular topic identifier in the base topic set
    comparing the unit of content associated with the particular topic identifier in the updated version of the structured document with the related unit of content associated with the particular topic identifier in the previous version of the structured document to determine whether the unit of content in the updated version of the structure document has been modified with respect to the related unit of content in the previous version of the structure document;
    generating a table of contents associated with the updated version of the structured document, the table of contents having one entry associated with each unit of content in the updated version of the structured document; and
    marking a first entry in the table of contents if the unit of content associated with the first entry has been modified a predetermined degree from a previous version of the content, wherein the predetermined degree is represented by a difference metric as determined by a content comparator, such that:
        in an event that the difference is counted as a modification, the difference metric represents each change in words, tags, and formatting, wherein the changes comprise changes in font, color, size, inserted content, and deleted content between the respective units of content in the updated version of the structured document and the previous version of the structured document; and
        in an event that not all differences are counted as modifications, changes are classified by type such that changes of meaning are classified in a different type than changes in form, wherein changes in form include rephrasing that does not change the meaning of the content, and the difference metric represents the number of changes of meaning within each unit of content.

2. A method as recited in claim 1 further comprising determining whether a modification in a unit of content associated with a marked entry is a relevant modification.

3. A method as recited in claim 1 further comprising classifying one or more modifications in a unit of content associated with a marked entry by a modification type.

4. A method as recited in claim 1 further comprising:
    generating an unmarked table of contents including one or more topic identifiers associated with the one or more units of content, wherein the unmarked table of contents serves as a previous version of the table of contents when changes are next indicated in the one or more units of content associated with the one or more topic identifiers;
    generating a set of one or more updated topic identifiers, each updated topic identifier being uniquely associated with one of the one or more units of content in the updated version of the structured document;
    associating each of the one or more topic identifiers in the unmarked table of contents with each of the one or more updated units of content.

5. A computer-readable storage medium having stored thereon computer-executable instructions that, when executed, cause a computer to perform a process comprising:
    determining that a unit of content in an updated version of a structured document and a related unit of content in a previous version of the structured document are associated with the same entry, wherein determining comprises:
        accessing a base topic set having a single topic identifier associated with each unit of content in the previous version of the structured document;
        accessing an updated topic set having a single topic identifier associated with each unit of content in the updated version of the structured document;
        identifying a particular topic identifier in the updated topic set that corresponds to the same particular topic identifier in the base topic set;

comparing the unit of content associated with the particular topic identifier in the updated version with the related unit of content associated with the particular topic identifier in the previous version to determine whether the unit of content in the updated version has been modified with respect to the related unit of content;

generating a table of contents associated with the updated version of the structured document, the table of contents having one entry associated with each unit of content in the updated version of the structured document; and marking a first entry in the table of contents if the unit of content associated with the first entry has been modified a predetermined degree from a previous version of the content, wherein the predetermined degree is represented by a difference metric as determined by a content comparator, such that:

in an event that the difference is counted as a modification, the difference metric represents each change in words, tags, and formatting, wherein the changes comprise changes in font, color, size, inserted content, and deleted content between the respective units of content in the updated version and the previous version; and in an event that not all differences are counted as modifications, changes are classified by type such that changes of meaning are classified in a different type than changes in form, wherein changes in form include rephrasing that does not change the meaning of the content, and the difference metric represents the number of changes of meaning within each unit of content.

6. A computer-readable storage medium as recited in claim 5 wherein the generating comprises generating an unmarked table of contents associated with the updated version of the structured document.

7. A computer-readable storage medium as recited in claim 5 wherein the process further comprises combining the table of contents with the one or more units of content to generate the updated version of the structured document.

8. A computer-readable storage medium as recited in claim 5 further comprising marking a second entry in the table of contents if the unit of content associated with the second entry is a new unit of content with respect to a previous version of the structured document, wherein a new unit of content corresponds to a unit of content which had not previously been addressed.

9. A computer-readable storage medium as recited in claim 5 wherein marking the first entry comprises displaying a symbol near the first entry, the symbol indicating that the associated unit of content has been modified.

10. A computer-readable storage medium as recited in claim 8 wherein marking the second entry comprises displaying a symbol near the second entry, the symbol indicating that the associated unit of content is new.

11. A computer-readable storage medium as recited in claim 8 wherein marking the first entry and the second entry comprises presenting a symbol near each of the first entry and the second entry, the symbol indicating that the units of content associated with the first entry and the second are either new or modified.

12. A computer-readable storage medium as recited in claim 10 wherein the marking further comprises:

marking each entry in the table of contents in an event that the unit of content associated with the entry has been modified the predetermined degree from a previous version of the content, such that:

in an event that the predetermined degree indicates not less than a threshold number of changes in the unit of content is represented by the difference metric as determined by a content comparator, the associated topic identifier is copied in a list of modified topics; and in an event that the predetermined degree indicates not less than a threshold percentage of change in the unit of content is represented by the difference metric as determined by a content comparator, the associated topic identifier is copied in a list of modified topics generated by a modified content identification module.

13. A system comprising:

means for storing one or more units of content included in an updated version of a structured document;

means for updating a table of contents having an entry associated with each unit of content;

means for automatically generating a list of modified topics comprising means for determining that a unit of content in the updated version of the structured document and a related unit of content in a previous version of the structured document are associated with the same entry, wherein the means for determining comprises:

means for accessing a base topic set having a single topic identifier associated with each unit of content in the previous version of the structured document;

means for accessing an updated topic set having a single topic identifier associated with each unit of content in the updated version of the structured document;

means for identifying a particular topic identifier in the updated topic set that corresponds to the same particular topic identifier in the base topic set;

means for comparing the unit of content associated with the particular topic identifier in the updated version of the structured document with the related unit of content associated with the particular topic identifier in the previous version of the structured document, to determine whether the unit of content in the updated version of the structured document has been modified with respect to the related unit of content in the previous version of the structured document;

means for generating a table of contents associated with the updated version of a structured document, the table of contents having one entry associated with each unit of content in the updated version of the structured document; and means for automatically marking a first entry in the table of contents indicating that the unit of content associated with the first entry has been modified a predetermined degree from a previous version of the content, wherein the predetermined degree is represented by a difference metric as determined by a content comparator, such that:

in an event that the each difference is counted as a modification, the difference metric represents each change in words, tags, and formatting, wherein the changes comprise changes in font, color, size, inserted content, and deleted content between the respective units of content in the updated version of the structured document and the previous version of the structured document; and in an event that not all differences are counted as modifications, changes are classified by type such that changes of meaning are classified in a different type than changes in form, wherein changes in form include rephrasing that does not change the meaning of the content. and the difference metric represents the number of changes of meaning within each unit of content.

14. A system as recited in claim 13 wherein the means for identifying comprises a new topic identification module generating a list of new topics.

15. A system as recited in claim 14 wherein the means for marking comprises a table of contents marking module receiving the list of new topics and marking associated entries in the table of contents.

* * * * *

UNITED STATES PATENT AND TRADEMARK OFFICE
CERTIFICATE OF CORRECTION

| | | |
|---|---|---|
| PATENT NO. | : 7,487,190 B2 | |
| APPLICATION NO. | : 10/927676 | |
| DATED | : February 3, 2009 | |
| INVENTOR(S) | : Jason E. Black et al. | |

It is certified that error appears in the above-identified patent and that said Letters Patent is hereby corrected as shown below:

In column 11, line 52, in Claim 1, delete "undated" and insert -- updated --, therefor.

In column 13, line 26, in Claim 5, delete "arc" and insert -- are --, therefor.

In column 13, line 65, in Claim 12, delete "10" and insert -- 5 --, therefor.

In column 15, line 6, in Claim 13, delete "content." and insert -- content, --, therefor.

Signed and Sealed this
Third Day of May, 2011

David J. Kappos
*Director of the United States Patent and Trademark Office*